United States Patent
Seidel et al.

(10) Patent No.: US 7,029,748 B2
(45) Date of Patent: Apr. 18, 2006

(54) POLYTRIMETHYLENE TEREPHTHALATE RESINS WITH IMPROVED PROPERTIES

(75) Inventors: Eckhard Seidel, Frankfurt (DE); Bernd Gemmel, Gelnhausen (DE); Karl-Heinz Heldmann, Raunheim (DE)

(73) Assignee: Zimmer A.G., Frankfurt am Main (DE)

( * ) Notice: Subject to any disclaimer, the term of this patent is extended or adjusted under 35 U.S.C. 154(b) by 0 days.

(21) Appl. No.: 10/508,292

(22) PCT Filed: Feb. 20, 2003

(86) PCT No.: PCT/EP03/01712
§ 371 (c)(1),
(2), (4) Date: Sep. 21, 2004

(87) PCT Pub. No.: WO03/080702
PCT Pub. Date: Oct. 2, 2003

(65) Prior Publication Data
US 2005/0143504 A1    Jun. 30, 2005

(30) Foreign Application Priority Data
Mar. 23, 2002  (EP) ................................. 02006746

(51) Int. Cl.
*B32B 7/02*     (2006.01)
*C08J 3/00*     (2006.01)

(52) U.S. Cl. ...................... 428/221; 528/492; 525/437; 525/444; 524/86; 524/87; 524/89; 524/91; 524/115; 524/155; 428/364

(58) Field of Classification Search ................ 528/492; 525/437, 444; 524/86, 87, 89, 91, 115, 155; 428/221, 364
See application file for complete search history.

(56) References Cited

U.S. PATENT DOCUMENTS

| 6,326,456 B1 | 12/2001 | Kelsey et al. ................ 528/279 |
| 2002/0010310 A1 | 1/2002 | Allen et al. .................. 528/275 |

FOREIGN PATENT DOCUMENTS

| EP | 0 078 455 A2 | 5/1983 |
| WO | 1 142 955 A1 | 10/2001 |
| WO | WO 01/81447 A2 | 11/2001 |
| WO | WO 01/81470 A1 | 11/2001 |

*Primary Examiner*—Samuel A. Acquah
(74) *Attorney, Agent, or Firm*—McDonnell Boehnen Hulbert & Berghoff LLP

(57) ABSTRACT

A composition comprising Polytrimethylene terephthalate (PTT) with a reduced emission of acrolein is obtained by contacting Polytrimethylene terephthalate (PTT) resin with an effective amount of a melt unstable, organic nitrogen-containing stabilizing compound. Such PTT resin has an acrolein formation rate at 280° C. of less than 15 ppm/minute. Preferably the residual acrolein content of the PTT resin is less than 5 ppm. Preferred additive compounds include amines, amino acids, amidines, urea and other N-compounds. The additive compounds are added to the polymer in molten state and/or to the resin, which is then processed to fibers, filaments, non-wovens, films and/or moldings.

22 Claims, No Drawings

POLYTRIMETHYLENE TEREPHTHALATE RESINS WITH IMPROVED PROPERTIES

The present invention relates to polytrimethylene terephthalate (PTT) resins having a low contaminants formation rate and a low content of residual contaminants, to a method for the production of such resins and to articles obtained from said resins.

In general the polytrimethylene terephthalate resins used for the production of filaments, fibers and spin-fleeces for carpets, textile goods (wear, room textiles, technical textiles), further for the production of films and plastic materials have intrinsic viscosities usually above 0.75 dl/g. Resins with these values are obtained either by an all-melt polycondensation process of terephthalic acid or dimethyl-terephthalate with propanediol or by a two step process of melt and solid state polycondensation process, whereas in the first polycondensation reaction the intrinsic viscosity generally does not reach values higher than 0.6–0.7 dl/g and the resin viscosity has to be increased by solid-state polycondensation (SSP).

The all-melt process e.g. is performed as set forth in U.S. Pat. No. 6,277,947, a melt plus SSP process e.g. is disclosed in WO 97/23543.

The SSP reaction is performed by heating the pellets of the resin, after its crystallization, to a temperature from about 180° to 230° C. in a stream of inert gas (nitrogen or others) for a time sufficient to obtain the intended IV value.

During resin pelletizing and treatment steps such as extrusion of the chips to spin filaments, fibers and fleeces for carpets, textile goods (wear, room textiles, technical textiles) and further to produce films and plastic materials, contaminants are generated in considerable amounts.

Amongst the contaminants acrolein plays an important role. The residual acrolein content of the products can exceed up to 50 ppm and the acrolein formation rate, measured at 280° C., can be higher than 30 ppm/minute.

The presence of acrolein, like the presence of other contaminants, negatively affects the application of PTT products, specifically in presence of temperatures higher than 60° C.

Accordingly, it is desirable to have the lowest possible acrolein content in the resin that is used in human environment.

It is also desirable for articles which do not make contact with wear and room textiles to have a low residual acrolein content.

In order to obtain articles having a low residual acrolein content, the initial resin must be characterized not only by a low acrolein content but also and preferably by a low rate of acrolein formation at the process temperatures used to prepare the articles and at the thermal conditions of their application, i.e. during concentrated exposure to the sun's rays, ironing or drying processes.

Methods are known for obtaining polytrimethylene terephthalate resins with a low acrolein formation rate. It was found that PTT thermal stabilizers and antioxidants reduce the formation of acrolein in PTT when heated/aged in air as disclosed by U.S. Pat. No. 6,093,786 and U.S. Pat. No. 6,242,558. But PTT comprising these additives is deemed to involve the drawback of showing a considerable residual acrolein formation rate at ambient temperatures.

EP-A 1 142 955 discloses a titanium oxide-containing PTT resin composition. A PTT containing titanium oxide has the problem that the PTT forms large amounts of acrolein and allyl alcohol in comparison with PTT without titanium oxide. Therefore, in EP-A 1 142 955 the polycondensation is carried out in presence of a phosphorous compound and/or a hindered phenol in order to inhibit the generation of by products such as acrolein and allyl alcohol.

The generation of dipropylene glycol as a pre product of acrolein during PTT fabrication can be reduced by addition of basic metal salts to the reaction mixture before or during the polycondensation (US 2002/010310 A1).

In WO 01/81447 a PTT polymer is disclosed with reduced amounts of dipropylene glycol monomer units. This composition is obtained without addition of any stabilizers and when heated in air, it has a reduced tendency to generate acrolein.

WO 00/58393 discloses melt stable aliphatic and aromatic amines and amides as stabilizing additives for 3-hydroxypropanoxy terminated polymers which reduce the emission of acrolein from such polymers (e.g. PTT).

Surprisingly it has been found that the emission of acrolein from a Polytrimethylene terephthalate (PTT) resin can be reduced by a composition comprising Polytrimethylene terephthalate (PTT), wherein the composition is obtainable by contacting molten Polytrimethylene terephthalate (PTT) resin with an effective amount of a melt unstable, organic nitrogen-containing stabilizing compound.

The term melt unstable means that said organic nitrogen-containing stabilizing compound has a decomposition temperature which is lower than the usual temperature of a PTT melt during processing of about 250–280° C. Said decomposition temperatures of compounds are not determined in a PTT melt itself but by usual analytical methods (e.g. kofler hot bench). Such methods and decomposition temperatures are generally known from literature (e.g. Handbook of Chemistry and Physics, $83^{th}$ edition, CRC Press, Boca Raton, 2002).

According to the invention there is provided for the first time a polytrimethylene terephthalate (PTT) resin composition having an acrolein formation rate at 280° C. of less than 15 ppm/minute, preferably lower than 1 ppm/minute and particularly lower than 0.1 ppm/min. The PTT resin composition of the invention advantageously is characterized by a low acrolein content of <5 ppm, preferred <1 ppm and most preferred <0.1 ppm.

The said compound can be added to the PTT either when the PTT is in the molten state or when the PTT is in the solid state, provided that the solid state PTT is processed thereafter through the molten state, thereby allowing for a thorough mixing of PTT and additive.

The amount of compound to be added to the PTT may vary over a broad range. It is preferred, however, that the compound is added in an amount of 10–30.000 ppm based on the total weight of the PTT.

The behavior of the polytrimethylene terephthalate resins comprising substances according to the present invention is unusual with respect to the formation of acrolein, since the compounds usually added to PTT as stabilizers and antioxidants do not result in a limitation of the acrolein content or the formation rate of acrolein.

It is known that thermal stabilizers and antioxidants in an amount in the range from 0.1 to 1% by weight are added to the Polytrimethylene terephthalate resin during the preparation of said resin in the esterification or transesterification step or in the subsequent step of polycondensation in the melt. Widely used thermal stabilizers for the purpose of stabilization embrace e.g. phosphorous compounds. Widely used antioxidants encompass e.g. hindered phenols.

It is known from U.S. Pat. No. 6,093,786 and U.S. Pat. No. 6,242,558 that the generation of acrolein in the destillate streams during the polymerization of PTT is reduced when an organophosphite thermal stabilizer is added during the reaction and also that the addition of a hindered phenolic antioxidant to PTT results in a polymer which is lower in color and less likely to generate acrolein when heated/aged in air. The resulting PTT resins have acrolein concentrations of >5 ppm in the PTT.

U.S. Pat. No. 6,326,456 discloses phosphorous compounds, hindered phenolic esters and organophosphites as stabilizers which stop the catalysis of the thermal degradation of PTT melt by ions of heavy metals.

Using the compounds in accordance with the present invention in concentrations of 10 to 30.000 ppm related to the polymer the concentration of acrolein in the pellets can be reduced to <5 ppm preferably <1 ppm and most preferred <0.1 ppm.

The compounds preferably are added to the PTT melt before pelletizing. These compounds reduce the content of acrolein in the PTT after re-extrusion of the chips and spinning to fibers or processing to other application products. It was found that the effect of the said compounds continued also under solid conditions and the acrolein content in the chips, fibers and other application products still decreased.

Heating the PTT products the acrolein formation rate dramatically is lowered as well.

Preferred examples of such compounds which reduce the emission of acrolein are organic additives characterized as molecules containing at least one hydrogen-substituted nitrogen and at least one additional hydrogen-substituted heteroatom including oxygen, nitrogen or sulfur, bonded to the carbon skeleton of the molecule.

Preferred examples of these additives to reduce the emission of acrolein from PTT are selected from the group consisting of
1-aminoethanol,
N-acetylethanolamine,
triacetondiamine,
allantoin,
2-amino-2-methyl-1,3-propanediol,
4-amino-3-hydroxybenzoic acid,
benzimidazolamide,
antranilic acid,
dianilinoethane,
malonamide,
o-mercaptobenzamide,
salicylamide,
4-aminosalicylic acid,
salicylanilide,
aminoiminomethanesulphinic acid,
6-aminohexanoic acid,
2-amino-4-butyric acid,
N-(2-acetamido)-iminodiacetic acid, and/or
D-glucosamine.

In another embodiment the compound which is added for reducing the emission of acrolein is an amino acid or a derivative of an amino acid. Preferred examples are selected from the group consisting of
glycine,
N-benzoylglycine (hippuric acid),
alanine,
serine,
proline,
arginine,
glutamine and/or
cysteine.

In addition another group of compounds was found which also effect an acrolein reduction in PTT as
amidines with the formula HN=C(NH$_2$)—R, or wherein R is hydrogen, C$_1$–C$_6$ alkyl or C$_5$–C$_6$ cycloalkyl or C$_2$–C$_6$ alkylen having a functional end group selected from —COOH, —OH, —NH$_2$ and =NH, or R is phenyl, aminophenyl, carboxyphenyl, hydroxyphenyl, benzyl.

Particularly preferred amidines include formamidine, formamidine, acetamidine, propionamidine, benzamidine and/or 4-aminobenzamidine, and their salts.

Furthermore the following compounds effect on acrolein: urea and thiourea and their derivates as biuret, guanidine and its derivates, isatine (2,3-dihydroindol-2,3-dione), 2h-3,1 benzoxazine-2,4-(1h)-dione (isatoic acid), 1-methyl urea, N-methyl-carbanilid, carbamidoxide, phthalamaic acid, N,N'-diethylthiourea and/or N,N'-diphenylthiourea.

It should be noted that all of the above additives can be used singly or in a mixture of two or more compounds.

Said compounds preferably are added to the resin in the melt by mixing before pelletizing or in an extruder before forming moldings or fibers or before subjecting the resin to the SSP step.

The treatment of the resin in the molten state can be advantageously performed in an inert-gas atmosphere (nitrogen), for example by passing a stream of inert gas flow in the environment in which preparation of the articles occurs. It is also possible to work in air, but less satisfactory results are obtained.

It has been found, and it is another aspect of the invention, that it is possible to avoid coloring problems due to the presence of the compounds in accordance with the present invention in the melt or when the solid resin is subjected to SSP at a temperature above 180° C. or when the solid resin is re-extruded before forming moldings and fibers by using these compounds in combination with thermal stabilizers and antioxidants.

As already indicated, the antioxidants can be used in combination with the said acrolein converting compounds can be used in the process according to the present invention.

The antioxidants preferably include phosphites having the formula P(OR')$_3$, whereas R are identical or different and are alkyl or aryl groups.

It is also possible to use phosphates having the formula OP(OR)$_3$, whereas R has the above mentioned meaning.

Diphosphite compounds such as "Ultranox 626" or "Ultranox 627" (Brand names of compounds marketed by General Electric Specialty Chemicals) are preferred.

Especially preferred are phosphonic acid derivatives of the formula Z-R—(PO)(OH)$_2$ with R=(CH$_2$)$_n$ and n=1–6 and Z=COOH, OH or NH$_2$.

Other antioxidants which can be used are phenolic antioxidants, such as hindered phenolic compounds, for example the compound "Irganox 1010" or "Irganox 1076" by Ciba-Geigy or the compounds as discussed in U.S. Pat. No. 6,093,786 and U.S. Pat. No. 6,242,558.

The PTT can comprise up to 20% other monomer units as naphthalene dicarbonic acid or hydroxybenzoic acid or other diols like butanediol or ethanediol or cyclohexanediol.

In accordance with the present invention also polymer blends up to 20 wt. % with other polyesters or combinations of them as polybutylene terephthalate, polyethylene terephthalate, polyethylene naphthalate and/or copolyethylene terephthalate can be used as PTT resins.

Resins with a low acrolein formation rate and low acrolein content having an intrinsic viscosity of more than 0.75 dl/g and being obtained in an all-melt process or by additional solid stating are particularly suitable for the production of filaments, fibers and spin-fleeces for carpets, textile goods (wear, room textiles, technical textiles), further for the production of films and plastic materials and for any other application which requires a low acrolein content and a low acrolein formation rate.

The following examples are given by way of non-limitative illustration of the invention.

Analytical Methods:

Acrolein Content by Headspace-GC 1 g of PTT polymer which has been ground in liquid nitrogen is heated in a closed vial under nitrogen atmosphere at 150° C. for 30 minutes. From the vapour space of the vial a sample is taken and transferred to a gas chromatograph equipped with a flame ionization detector for analysis of the acrolein content.

Acrolein Formation by Thermodesorption-GC

Prior to analysis PTT polymer is ground in liquid nitrogen. A sample of 200 mg is heated in a nitrogen stream at 280° C. for 12 minutes. The nitrogen-stream is passed through a trap filled with TENAX (reg. trade mark) where the organic components are removed from the stream. After the specified time the organic load is removed from the trap by rapid temperature increase transferred by a nitrogen stream to a gas chromatograph (FID) where it is further analyzed.

Intrinsic Viscosity (IV)

125–145 mg polymer are weighed into a cylindrical dissolution vessel, 25 ml phenol/1,2 dichlorbenzene (60:40 w.w.) is added. The sample is stirred 20 min at 135° C. and cooled down. The IV of the solution is measured in an Ubbelohde viscosimeter at 25° C.

EXAMPLES

1. PTT Chips were dried (10 h, 130° C.), mixed with the powder of the nitrogen containing compound, extruded by a Husmann Extruder Model ES 30, throughput 6 kg/h at 260° C. The melt passed a 9 element mixing line (DN15 SMX, Sulzer) within 4 min. and was spun out to strand. The strand was cooled by a 2 m long waterbath and granulated by a Scheer lab cutter to PTT chips. The chips were dried (10 h, 130° C.) and prepared to analyze the acrolein content.

2. Comparison example, chip
   PTT chips without the additives of the present invention were re-extruded under the same conditions as described in example 1 and prepared to analyze the acrolein content.

3. Comparison example, filament
   Corterra-type crystalline PTT chips (Shell Oil Company (USA)) with an intrinsic viscosity of 0.91 dl/g, a crystallization temperature of 71° C., and a glass transition temperature of 46° C., were dried in a tumble dryer at a temperature of 130° C. to a water content of 11 ppm. The chips were melted in a 3E4 extruder from the firm Barmag, so that the temperature of the melt amounted to 254° C. The melt was then conveyed to the spinning pump through a product line and fed to a spinning pump wherein the melt throughput to the spin pack was controlled to 76.1 g/min. The melt was extruded through a nozzle plate 80 mm in diameter, with 48 holes 0.25 mm in diameter and a length of 0.75 mm. The nozzle pressure amounted to approximately 120 bar.

Subsequently to that, the filaments were cooled off in a blowing shaft with a crossflow quench system having a length of 1500 mm. The cooling air had a speed of 0.55 m/sec., a temperature of 18° C., and a relative humidity of 80%. The filaments were provided with spinning preparation and bundled with the help of an oiling device at a distance of 1500 mm from the nozzle. The oiling device was provided with a TriboFil surface. The quantity of preparation applied amounted to 0.40% in relation to the weight of the thread.

Thereafter the bundled multi-filament yarns were drawn off by the use of a godet system consisting of two duos, wherein the multi-filament yarns loop each duo one times. The take-up speed at the first duo amounted to 2,987 m/min and the draw-off speed at the second duo amounted to 3,000 m/min.

Finally the heat-treated multi-filament yarns were wound on a type SW6 winder (BARMAG (Germany)) at a winding speed of 3,075 m/min.

The multi-filament yarns had a titer of 248 dtex, a tensile strength of 24,1 cN/tex and an elongation at break of 105%.

4. The Corterra PTT chips as used in example 3 were mixed after drying with 0.15 wt. % dryed Formamidine acetate and processed in the same way as in example 3. The resulting filaments had a titer of 248 dtex, a tensile strength of 23,6 cN/tex and an elongation at break of 106%.

5. Re-extruded grounded PTT samples of pellets and POY strands were filled in the desorption apparatus to desorb and analyze the acrolein. The following table shows the results of the analysis:

| Sample | Acrolein desorption from original chips [ppm/12 min] | Acrolein desorption from reextruded chip/fiber [ppm/12 min] | Acrolein reduction [%] |
|---|---|---|---|
| Sample1 | 426 | 420 | none |
| Sample1 + 0.25% formamidine acetate | — | 0.5 | almost 100 |
| Sample2 | 451 | 450 | none |
| Sample2 + 0.1% urea | — | 1.2 | 99 |
| Sample3 filament thread of PTT POY 248 dtex | 440 | 420 | none |
| Sample3 + 0.15% formamidine acetate | — | 1 | almost 100 |

6. The PTT samples were analysed by the Headspace GC-Method to detect acrolein concentration in the reextruded polymer and filaments. The following table shows the results:

| Sample | Acrolein concentration in the reextruded chips [ppm] | Acrolein reduction related to sample1 [%] |
|---|---|---|
| Sample1 | 15 | none |
| Sample1 + 0.1% formamidine acetate | 2.2 | 85 |
| Sample1 + 0.5% formamidine acetate | 1.2 | 92 |
| Sample2 | 25 | none |

-continued

| Sample | Acrolein concentration in the reextruded chips [ppm] | Acrolein reduction related to sample1 [%] |
|---|---|---|
| Sample2 + 0.1% urea | not detectable | 100 |
| sample3 filament thread of PTT POY 248 dtex | 6 | none |
| sample 3 + 0.15% formamidine acetate | not detectable | 100 |

7. Repeating of Headspace GC-Method to analyze acrolein in the PTT Chips after storage of the samples at 25° C.:

| Sample | Storage time [days] | Acrolein concentration in the reextruded chips after storage [ppm] | Acrolein reduction related to sample1 [%] |
|---|---|---|---|
| Sample1 | 0 | 15 | none |
| Sample1 | 7 | 13 | 13 |
| Sample1 + 0.1% formamidine acetate | 7 | 1.3 | 90 |
| Sample1 + 0.5% formamidine acetate | 7 | 0.5 | 96 |
| Sample2 | 7 | 23 | 8 |
| Sample2 + 0.05% urea | 7 | 5 | 78 |
| Sample2 + 0.05% urea | 14 | 1.7 | 93 |

8. In the following experiments stabilizing nitrogen containing compounds were mixed with dried PTT and the composition was subsequently reextruded. The acrolein contents in reextruded PTT compositions are shown in the following table. Decomposition temperatures of the compounds were taken from literature.

| Sample No. | Nitrogen containing compound (0.1% wt. - % in reextruded PTT) | decomposition point of N-compound [° C.] | Lit.[1] | acrolein content in PTT after treatment [ppm] |
|---|---|---|---|---|
| 1 | 1-aminoethanol | 110 | 1 | 1.4 |
| 2 | diethylhydroxylamine | 125 | 2 | 0.7 |
| 3 | urea | 132 | 2 | 1.2 |
| 4 | N-acetylethanolamine | 152 | 3 | 2.7 |
| 5 | cysteine hydrochloride monohydrate | 175 | 2 | 0.8 |
| 6 | o-hydroxyhippuric acid | 175 | 2 | 2.9 |
| 7 | L-glutamine | 186 | 1 | 1.2 |
| 8 | hippuric acid (N-benzoylglycine) | 193 | 4 | 3.0 |
| 9 | biuret | 190 | 1 | 1.0 |
| 10 | β-alanine | 199 | 1 | 0.9 |
| 11 | guanidincarbonate | 180 | 2 | 0.7 |
| 12 | formamidine acetate | 215 | 1/6 | 8.5 |
| 13 | N-(2-acetamido)-iminodiacetic acid | 218 | 2 | 3.6 |
| 14 | L-proline | 220 | 5 | 3.9 |
| 15 | serine | 228 | 1 | 2.7 |
| 16 | allantoin | 230 | 7 | 0.5 |
| comparative examples: | | | | |
| 17 | — | — | — | 26 |
| 18 | 6-caprolactam | >271 | 2 | 20 |
| 19 | polyamide 6 | >310 | 8 | 17 |

[1]Literature:
1. Handbook of Chemistry and Physics, 85th ed.
2. catalogue of chemicals, Merck KGaA, Darmstadt, Germany
3. Chemical dictionary Chempros, a venture of A.G. Neochem Pvt. Ltd. (www.chempros.com/knowledgebase)
4. Zone melting of organic chemicals, E.F.G. Herring, John Wiley & Sons 1963
5. Amino acids, Publication of Ajinomoto Co. Japan 2002 (www.ajinomoto.co.jp)
6. catalogue of chemicals, chemistry department, FU Berlin, Germany
7. Manual 0001192EM Industries, Inc., Rona, Hawthorne, NY (www.suppliercd.com/scd10/Rona0001)
8. Injection molding, processing guide for Capron® Nylon, 2002; Honeywell Plastics The above results show that nitrogen containing organic compounds whose decomposition temperature is below the processing temperature of PTT (melt unstable compounds) effect a strong decrease of acrolein content in reextruded PTT. The residual acrolein content is about ten times as high without addition of any stabilizing compound (sample 17). Nitrogen containing compounds which are stable under the processing conditions of PTT (6-caprolactam and polyamide 6, sample 18 and 19) show a much lower effectiveness in decreasing acrolein than melt unstable compounds according to the present invention.

The invention claimed is:

1. A method of reducing the emission of acrolein from a composition comprising polytrimethylene terephthalate (PTT), the method comprising contacting an effective amount of a melt unstable, organic nitrogen-containing stabilizing compound with the PTT composition.

2. The method according to claim 1, wherein said composition has an acrolein formation rate at 280° C. of less than 15 ppm/minute.

3. The method according to claim 1, wherein said composition has an acrolein formation rate at 280° C. of less than 1 ppm/minute.

4. The method according to claim 1, wherein said composition has an acrolein formation rate at 280° C. of less than 0.1 ppm/minute.

5. The method in accordance with claim 1, wherein the residual acrolein content in the composition is less than 5 ppm.

6. The method in accordance with claim 5, wherein the residual acrolein content in the composition is less than 1 ppm.

7. The method in accordance with claim 6, wherein the residual acrolein content in the composition is less than 0.1 ppm.

8. The method of claim 1 wherein the stabilizing compound is added in an amount of 10–30.000 ppm based on the total weight of the PTT resin.

9. The method according to claim 1 wherein the stabilizing compound to be added has a molecular structure containing at least one hydrogen substituted nitrogen and at least one additional hydrogen-substituted heteroatom including oxygen, nitrogen or sulfur, bonded to the carbon skeleton of the molecular structure.

10. The method according to claim 9 wherein the stabilizing compound to be added is selected from the group consisting of 1-aminoethanol, N-acetylethanolamine, triacetondiamine, allantoin, 2-amino-2-methyl-1,3-propanediol, 4-amino-3-hydroxybenzoic acid, benzimidazolamide, antranilic acid, dianilinoethane, malonamide, o-mercaptobenzamide, salicylamide, 4-aminosalicylic acid, salicylanilide, aminoiminomethanesulphinic acid, 6-aminohexanoic acid, 2-amino-4-butyric acid, N-(2-acetamido)-iminodiacetic acid and/or D-glucosamine.

11. The method according to claim 1 wherein the stabilizing compound to be added is an amino acid or a derivative of an amino acid.

12. The method according to claim 11 wherein the stabilizing compound to be added is selected from the group consisting of glycine, N-benzoylglycine, alanine, serine, proline, arginine, glutamine and cysteine.

13. The method according to claim 1 wherein the stabilizing compound to be added is an amidine having the formula $HN=C(NH_2)-R$, wherein R is $C_1-C_6$ alkyl or $C_5-C_6$ cycloalkyl or $C_2-C_6$ alkylene having a functional end group selected from —COOH, —OH, —$NH_2$, =NH, or R is selected from the group consisting of phenyl, aminophenyl, carboxyphenyl, hydroxyphenyl and benzyl.

14. The method according to claim 13 wherein the stabilizing compound to be added is formamidine, acetamidine, propionamidine, benzamidine and/or 4-aminobenzamidine.

15. The method according to claim 1 wherein the stabilizing compound to be added is selected from the group consisting of urea, thiourea, biuret, guanidine and its derivates, indoline-2,3-dione (isatine), 2-(carboxyamino)benzoic acid (isatoic acid), 1-methyl urea, N-methylcarbanilide, carbamidoxide, phthalamic acid, N,N'-diethylthiourea and N,N'diphenylthiourea.

16. The method according to claim 1, wherein the composition has an intrinsic viscosity of greater than 0.7 dl/g.

17. The method use according to claim 1, wherein the composition contains up to 20% by weight of polyethylene terephthalate, polyethylene naphthalate, polybutylene terephthalate or copolyethylene terephthalate.

18. The method according to claim 1 wherein the composition contains one or more of polymer stabilizers selected from the group consisting of phosphorous acid, phosphoric acid, alkylesters of phosphoric acid, hydroxyalkylester of phosphoric acid, diphosphites and phosphonic acids in a concentration of 1–200 ppm as phosphorus in the substances.

19. The method according to claim 18 whereas the phosphonic acid is selected from 2-carboxyalkylphosphonic acid, 2-hydroxyalkylphosphonic acid, 2-aminoalkylphosphonic acid and the alkyl group is selected from methyl, propyl, butyl, pentyl and hexyl.

20. The method according to claim 1, wherein the composition contains thermo-oxidative polymer stabilisers as phenolic antioxidants, such as hindered phenolic compounds in concentrations of 0.1–3% by weight.

21. The method according to claim 1, wherein the composition has been subjected to a solid state polycondensation reaction in an inert-gas atmosphere.

22. A method according to claim 1 wherein the melt unstable, organic nitrogen-containing stabilizing compound and optionally thermostabilizer and/or antioxidants are added to the polymer in molten state and optionally to the resin, which is then processed to fibers, filaments, nonwovens, films and/or mouldings.

* * * * *